United States Patent
Liang et al.

(10) Patent No.: US 12,185,416 B2
(45) Date of Patent: Dec. 31, 2024

(54) SIDELINK RELEASE METHOD, TERMINAL AND NETWORK SIDE DEVICE

(71) Applicant: VIVO MOBILE COMMUNICATION CO., LTD., Guangdong (CN)

(72) Inventors: Jing Liang, Dongguan (CN); Qian Zheng, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 468 days.

(21) Appl. No.: 17/245,081

(22) Filed: Apr. 30, 2021

(65) Prior Publication Data
US 2021/0251039 A1 Aug. 12, 2021

Related U.S. Application Data

(63) Continuation of application No. PCT/CN2019/114668, filed on Oct. 31, 2019.

(30) Foreign Application Priority Data

Nov. 1, 2018 (CN) .......................... 201811297557.0

(51) Int. Cl.
*H04W 4/00* (2018.01)
*H04W 76/27* (2018.01)
*H04W 76/38* (2018.01)
*H04W 80/02* (2009.01)

(52) U.S. Cl.
CPC ........... *H04W 76/38* (2018.02); *H04W 76/27* (2018.02); *H04W 80/02* (2013.01)

(58) Field of Classification Search
CPC .............................. H04W 76/27; H04W 76/38
See application file for complete search history.

(56) References Cited

U.S. PATENT DOCUMENTS

2018/0103460 A1   4/2018   Sharma et al.
2018/0279275 A1*  9/2018   Chen ..................... H04W 72/23
(Continued)

FOREIGN PATENT DOCUMENTS

| CN | 107645774 A | 1/2018 |
| CN | 107771410 A | 3/2018 |
| CN | 108307489 A | 7/2018 |

(Continued)

OTHER PUBLICATIONS

First Office Action regarding Korean Patent Application No. 10-2021-7016328, dated Apr. 24, 2023. Translation provided.

(Continued)

*Primary Examiner* — Elisabeth Benoit Magloire (74) *Attorney, Agent, or Firm* — Harness, Dickey & Pierce, P.L.C.

(57) ABSTRACT

A sidelink release method includes: obtaining a sidelink release timer, where the sidelink release timer is configured or preconfigured by a network side device, or the sidelink release timer is configured by a second terminal or obtained by a second terminal from a network side configuration; starting or restarting the sidelink release timer after data is received and sent on a sidelink connection to the second terminal; and sending a sidelink connection release message to the second terminal or notifying a higher layer of the first terminal after the sidelink release timer expires.

20 Claims, 3 Drawing Sheets

(56) References Cited

U.S. PATENT DOCUMENTS

| | | | |
|---|---|---|---|
| 2019/0045576 A1* | 2/2019 | Jung | ................... H04W 76/19 |
| 2020/0221532 A1 | 7/2020 | Jung et al. | |

FOREIGN PATENT DOCUMENTS

| | | | | |
|---|---|---|---|---|
| CN | 110944306 A | * | 3/2020 | |
| EP | 3397003 A1 | * | 10/2018 | ........ H04W 36/0055 |
| EP | 3499975 A1 | | 6/2019 | |
| WO | WO-2013110851 A1 | | 8/2013 | |
| WO | WO-2015163626 A1 | * | 10/2015 | ............ H04W 76/11 |
| WO | WO-2019066546 A1 | * | 4/2019 | ............ H04W 76/18 |

OTHER PUBLICATIONS

"Considerations on PC5 connection for power efficiency," ZTE, 3GPP TSG-RAN WG2 Meeting #97bis, R2-1703070, dated Apr. 7, 2017.

International Search Report and Written Opinion of the International Searching Authority regarding International Patent Application No. PCT/CN2019/114668, dated Feb. 6, 2020. Translation provided by Bohui Intellectual Property.

"Sidelink resource allocation mechanism for NR V2X," Huawei, HiSilicon, 3GPP TSG RAN WG1 Meeting #94bis, R1-1811904, dated Oct. 12, 2018.

"On NR Uu to support NR V2X services," MediaTek Inc., 3GPP TSG RAN WG1 Meeting #94, R1-1808283, dated Aug. 24, 2018.

First Office Action regarding Chinese Patent Application No. 201811297557.0, dated May 8, 2021. Translation provided by Bohui Intellectual Property.

Supplementary European Search Report regarding Application No. 19880605.1-1231 / 3876664; PCT/CN2019/114668, dated Nov. 29, 2021.

"3rd Generation Partnership Project; Technical Specification Group Core Network and Terminals; Proximity-services (ProSe) User Equipment (UE) to ProSe function protocol aspects; Stage 3 (Release 14)," 3GPP TS 24.334 V14.1.0, Technical Specification, Sep. 2018.

* cited by examiner

SIDELINK RELEASE METHOD, TERMINAL AND NETWORK SIDE DEVICE

CROSS-REFERENCE TO RELATED APPLICATIONS

This application is a Bypass Continuation Application of PCT/CN2019/114668, filed on Oct. 31, 2019, which claims priority to Chinese Patent Application No. 201811297557.0, filed on Nov. 1, 2018, which are incorporated herein by reference in their entirety.

TECHNICAL FIELD

The present disclosure relates to the field of communications technologies, and in particular, to a sidelink release method, a terminal and a network side device.

BACKGROUND

A Long Term Evolution (LTE) sidelink (also referred to as a side link or an edge link) is based on broadcast mechanism communication, and cannot meet a quality of service (QoS) requirement for supporting an advanced vehicle to everything (V2X) service, for example, advanced V2X services that require a low latency, high reliability, and a large data volume such as self-driving and sensor extension. These advanced V2X services are supported by using a new radio (NR) sidelink.

However, for a sidelink, at present, there is no technical support for a terminal to disconnect a connection on the sidelink.

SUMMARY

According to a first aspect, an embodiment of the present disclosure provides a sidelink release method, applied to a first terminal and including:
  obtaining a sidelink release timer, where the sidelink release timer is configured or preconfigured by a network side device, or the sidelink release timer is configured by a second terminal or obtained by a second terminal from a network side configuration;
  starting or restarting the sidelink release timer after data is received from the second terminal or sent to the second terminal on a sidelink connection; and
  sending a sidelink connection release message to the second terminal or notifying a higher layer of the first terminal after the sidelink release timer expires.

According to a second aspect, an embodiment of the present disclosure provides a sidelink release method, applied to a second terminal and including:
  receiving a sidelink connection release message sent by a first terminal; and
  releasing a sidelink connection to the first terminal.

According to a third aspect, an embodiment of the present disclosure provides a sidelink release method, applied to a network side device and including:
  configuring a sidelink release timer for a first terminal, so that the first terminal releases a sidelink connection after the sidelink release timer expires.

According to a fourth aspect, an embodiment of the present disclosure provides a first terminal, including:
  an obtaining module, configured to obtain a sidelink release timer, where the sidelink release timer is configured or preconfigured by a network side device, or the sidelink release timer is configured by a second terminal or obtained by a second terminal from a network side configuration;
  a starting module, configured to start or restart the sidelink release timer after data is received from the second terminal or sent to the second terminal on a sidelink connection; and
  a sending module, configured to send a sidelink connection release message to the second terminal or notify a higher layer of the first terminal after the sidelink release timer expires.

According to a fifth aspect, an embodiment of the present disclosure provides a second terminal, including:
  a receiving module, configured to receive a sidelink connection release message sent by a first terminal; and
  a releasing module, configured to release a sidelink connection to the first terminal.

According to a sixth aspect, an embodiment of the present disclosure provides a network side device, including:
  a configuring module, configured to configure a sidelink release timer for a first terminal, so that the first terminal releases a sidelink connection after the sidelink release timer expires.

According to a seventh aspect, an embodiment of the present disclosure provides a communications device, including a memory, a processor, and a program that is stored in a memory and that can run on the processor. When the program is executed by the processor, steps in the foregoing sidelink release method are implemented.

According to an eighth aspect, an embodiment of the present disclosure provides a non-transitory computer-readable storage medium. The non-transitory computer-readable storage medium stores a program, and when the program is executed by a processor, steps of the foregoing sidelink release method are implemented.

DESCRIPTION OF EMBODIMENTS

To make the to-be-resolved technical problems, technical solutions, and advantages in the embodiments of the present disclosure clearer, detailed descriptions are provided below with reference to the accompanying drawings and specific embodiments.

A Long Term Evolution (LTE) sidelink (also referred to as a side link or an edge link) is based on broadcast mechanism communication, and cannot meet a quality of service (QoS) requirement for supporting an advanced vehicle to everything (V2X) service, for example, advanced V2X services that require a low latency, high reliability, and a large data volume such as self-driving and sensor extension. These advanced V2X services are supported by using a new radio NR sidelink.

A Long Term Evolution (LTE) system supports a sidelink (also referred to as a side link or an edge link), and is used to perform direct data transmission between terminals (User Equipment, UE) without using a network side device.

The UE sends sidelink control information (SCI) by using a physical sidelink control channel (PSCCH), and schedules transmission of a physical sidelink shared channel (PSSCH) to send data. The transmission is in the form of broadcast, and a receive end does not feed back to a transmit end whether reception is successful.

The design of LTE sidelink supports two resource allocation modes: a scheduled resource allocation mode and an autonomous resource selection mode. The scheduled resource allocation mode is controlled by the network side device and allocates a resource for each UE. For the autonomous resource selection mode, the resource is selected by the UE autonomously.

Starting from the Release 15, LTE supports sidelink carrier aggregation (CA). A CA interface and a Uu interface (a downlink and an uplink) of the LTE sidelink are different, and there is no distinction between a primary component carrier (PCC) and a secondary component carrier (SCC). The UE in the autonomous resource selection mode independently performs resource sensing and resource reservation on each CC.

The design of the LTE sidelink is applicable to specific public safety matters (such as emergency communication at a fire place or a disaster place such as an earthquake) or vehicle to everything (V2X) communication. Vehicle to everything communication includes various services such as basic security-related communication, advanced (autonomous) driving, platooning, and sensor extension. Because the LTE sidelink supports only broadcast communication, the LTE sidelink is mainly used for basic security-related communication, and another advanced V2X service is supported by using a new radio (NR) sidelink.

A 5G NR system can be used in an operating frequency band greater than 6 GHz that is not supported by LTE, and supports a larger operating bandwidth. However, the NR system in a current release only supports an interface between a base station and a terminal, and does not support a sidelink interface for direct communication between terminals.

In addition, for a sidelink, at present, there is no technical support for a terminal to disconnect a connection on the sidelink.

In view of the foregoing problem, the embodiments of the present disclosure provide a sidelink release method, a terminal and a network side device, so that a terminal can release an established connection on a sidelink.

Figure 1:
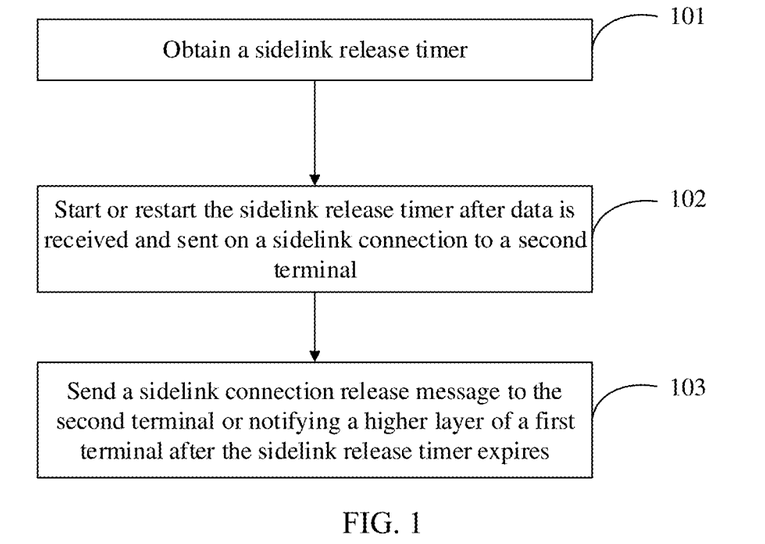
FIG. 1 is a schematic flowchart of a sidelink release method applied to a first terminal according to an embodiment of the present disclosure.

An embodiment of the present disclosure provides a sidelink release method, applied to a first terminal. As shown in FIG. 1, the method includes the following steps.

In step 101, a sidelink release timer is obtained. The sidelink release timer is configured or preconfigured by a network side device, or the sidelink release timer is configured by a second terminal or obtained by a second terminal from a network side configuration.

In step 102, the sidelink release timer is started or restarted after data is received from the second terminal or sent to the second terminal on a sidelink connection.

In step 103, a sidelink connection release message is sent to the second terminal or a higher layer of the first terminal is notified after the sidelink release timer expires.

In this embodiment, the network side device configures or preconfigures the sidelink release timer for the first terminal, or the second terminal configures the sidelink release timer or obtains the sidelink release timer from the network side configuration. After the sidelink release timer expires, the first terminal releases the sidelink connection to the second terminal. According to the technical solution of the present disclosure, the terminal can release an established connection on a sidelink.

Optionally, the notifying a higher layer of the first terminal includes at least one of the following:
notifying a release of the sidelink connection to the higher layer of the first terminal;
notifying a release cause of the sidelink connection to the higher layer of the first terminal;
notifying the higher layer of the first terminal that the sidelink release timer expires;
notifying the higher layer of the first terminal that the sidelink connection fails; or
notifying the higher layer of the first terminal that a radio link failure occurs in the first terminal.

Optionally, the obtaining the sidelink release timer configured by the network side device includes:
obtaining the sidelink release timer configured by the network side device by using dedicated signaling or a system message.

Further, the sidelink release timer is configured by the second terminal or obtained by the second terminal from the network side configuration, and the obtaining a sidelink release timer includes:
obtaining a sidelink release timer configuration sent by the second terminal.

Optionally, duration of the sidelink release timer is determined in at least one of the following manners:
a protocol stipulation; or
a configuration or preconfiguration of the network side device.

The configuration of the network side device is no longer required in the protocol stipulation manner, so that signaling interaction between the network side device and a terminal can be avoided. The duration of the sidelink release timer can be flexibly adjusted through the configuration or the preconfiguration of the network side device.

Optionally, the sidelink connection release message includes at least one of the following information:
an identifier of the first terminal;
an identifier of the second terminal, where the identifier of the first terminal and the identifier of the second terminal can enable the second terminal to accurately learn the sidelink connection that needs to be released; or
indication information of a sidelink connection release cause, where the indication information of the sidelink connection release cause can enable the second terminal to learn the reason for the sidelink connection release cause.

Optionally, the sidelink connection release cause includes at least one of the following:
the sidelink release timer expires; or
the sidelink connection fails.

Optionally, the method further includes at least one of the following:
receiving a connection release response message fed back by the second terminal, and releasing the sidelink connection to the second terminal; or
releasing the sidelink connection to the second terminal.

In this embodiment, the first terminal may release the sidelink connection after receiving the connection release response message fed back by the second terminal, or may release the sidelink connection when the connection release response message fed back by the second terminal is not received.

Optionally, the receiving a connection release response message fed back by the second terminal includes at least one of the following:
receiving a connection release response message fed back by a physical layer of the second terminal;
receiving a connection release response message fed back by a radio link control (RLC) layer of the second terminal; or
receiving a connection release response message of the second terminal.

Optionally, the releasing the sidelink connection to the second terminal includes at least one of the following:
resetting a media access control (MAC) layer;
stopping all running timers except a first timer, where the first timer is one or more timers configured by the first terminal or configured by the second terminal or configured by a base station or specified in a protocol;
releasing a radio bearer and a corresponding protocol layer entity;
notifying a release of the sidelink connection to the higher layer of the first terminal; or
notifying a release cause of the sidelink connection to the higher layer of the first terminal.

Optionally, the method further includes:
obtaining a data inactivity timer configured by the network side device; and
releasing a radio resource control (RRC) connection to the network side after the data inactivity timer expires, so that the terminal can be disconnected from the RRC connection to the network side.

Optionally, the sidelink release timer and the data inactivity timer are started or restarted in at least one of the following manners:
starting or restarting the sidelink release timer and the data inactivity timer after data is received from the second terminal or sent to the second terminal on the sidelink connection;
starting or restarting the sidelink release timer and skipping starting or skipping restarting the data inactivity timer after data is received from the second terminal or sent to the second terminal on the sidelink connection;
starting or restarting the sidelink release timer and the data inactivity timer after data is received from the network side or sent to the network side; or
starting or restarting the data inactivity timer and skipping starting or skipping restarting the sidelink release timer after data is received from the network side or sent to the network side.

It should be noted that data is sent and received between the first terminal and the network side by using a Uu interface.

Optionally, the releasing an RRC connection includes at least one of the following:
resetting the MAC layer;
stopping all running timers except a third timer, where the third timer is one or more timers configured by the first terminal or configured by the second terminal or configured by the base station or specified in the protocol;
releasing the radio bearer and the corresponding protocol layer entity;
notifying the release of the sidelink connection to the higher layer of the first terminal;
notifying the release cause of the sidelink connection to the higher layer of the first terminal; or
entering an RRC idle state or an RRC inactive state.

Optionally, the sidelink connection includes a sidelink unicast connection or a sidelink multicast connection. In the technical solution of the present disclosure, the terminal can release an established sidelink unicast connection or an established sidelink multicast connection.

Figure 2:
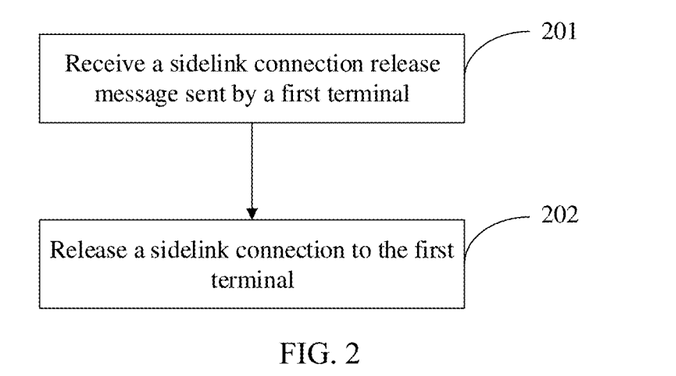
FIG. 2 is a schematic flowchart of a sidelink release method applied to a second terminal according to an embodiment of the present disclosure.

An embodiment of the present disclosure provides a sidelink release method, applied to a second terminal. As shown in FIG. 2, the method includes the following steps.

In step 201, a sidelink connection release message sent by a first terminal is received.

In step 202, a sidelink connection to the first terminal is released.

In this embodiment, after receiving the sidelink connection release message sent by the first terminal, the second terminal releases the sidelink connection to the first terminal. According to the technical solution of the present disclosure, the terminal can release an established connection on a sidelink.

Optionally, the sidelink connection release message includes at least one of the following information:
an identifier of the first terminal;
an identifier of the second terminal, where the identifier of the first terminal and the identifier of the second terminal can enable the second terminal to accurately learn the sidelink connection that needs to be released; or
indication information of a sidelink connection release cause, where the indication information of the sidelink connection release cause can enable the second terminal to learn the reason for the sidelink connection release cause.

Optionally, the sidelink connection release cause includes at least one of the following:
the sidelink release timer expires; or
the sidelink connection fails.

Optionally, the releasing the sidelink connection to the first terminal includes at least one of the following:
resetting a media access control MAC layer;
stopping all running timers except a second timer, where the second timer is one or more timers configured by the first terminal or configured by the second terminal or configured by a base station or specified in a protocol;
releasing a radio bearer and a corresponding protocol layer entity;
notifying a release of the sidelink connection to a higher layer of the second terminal; or
notifying a release cause of the sidelink connection to a higher layer of the second terminal.

Optionally, the method further includes:
sending a sidelink release timer configuration to the first terminal, where the sidelink release timer is configured by the second terminal or obtained by the second terminal from a network side configuration.

Optionally, the method further includes:
feeding back a connection release response message to the first terminal, so that the first terminal can release a sidelink connection to the second terminal after receiving the connection release response message.

Optionally, the feeding back a connection release response message to the first terminal includes at least one of the following:
feeding back, by a physical layer of the second terminal, a connection release response message to the first terminal;
feeding back, by a radio link control RLC layer of the second terminal, a connection release response message to the first terminal; or
feeding back, by the second terminal, a connection release response message to the first terminal.

Optionally, the sidelink connection includes a sidelink unicast connection or a sidelink multicast connection. In the technical solution of the present disclosure, the terminal can release an established sidelink unicast connection or an established sidelink multicast connection.

Figure 3:
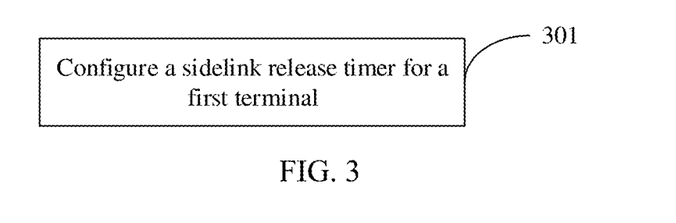
FIG. 3 is a schematic flowchart of a sidelink release method applied to a network side device according to an embodiment of the present disclosure.

An embodiment of the present disclosure provides a sidelink release method, applied to a network side device. As shown in FIG. 3, the method includes the following steps.

In step 301, a sidelink release timer is configured for a first terminal, so that the first terminal releases a sidelink connection after the sidelink release timer expires.

In this embodiment, the network side device configures or preconfigures the sidelink release timer for the first terminal. After the sidelink release timer expires, the first terminal releases the sidelink connection to the second terminal. According to the technical solutions of the present disclosure, the terminal can release an established connection on a sidelink.

Optionally, the configuring a sidelink release timer for a first terminal includes:
configuring the sidelink release timer for the first terminal by using dedicated signaling or a system message.

Optionally, the method further includes:
configuring a data inactivity timer for the first terminal, so that the first terminal releases a radio resource control RRC connection to a network side after the data inactivity timer expires.

The technical solution of the present disclosure will be further described below with reference to specific embodiments:

Embodiment 1

In this embodiment, a base station configures a sidelink release timer for UE1, and a sidelink unicast link is established between the UE1 and UE2. The UE1 may be a transmit end in sidelink transmission, the UE2 is a receive end in sidelink transmission, or the UE2 may be a transmit end in sidelink transmission, and the UE1 is a receive end in sidelink transmission. The UE1 performs transmission on a sidelink, for example, sends or receives a protocol data unit (PDU) and/or a service data unit (SDU) at a MAC layer or another layer, and starts or restarts the sidelink release timer. After the sidelink release timer expires, the UE1 automatically releases a sidelink unicast link.

The sidelink release method in this embodiment includes the following steps.

Step 1: the base station configures the sidelink release timer for the UE1 by using dedicated signaling or a system message, so that when the UE1 performs sidelink transmission, a link is automatically released based on the sidelink release timer. The sidelink release timer may act on a sidelink MAC layer of the UE1, or may act on another protocol layer.

Duration of the sidelink release timer may be specified in a protocol, or may be dynamically configured by the base station. The base station may dynamically configure the duration of the sidelink release timer based on a sidelink service type of the UE1.

Step 2: when performing sidelink unicast link transmission, the UE1 sends or receives a data packet, such as a MAC SDU, and starts or restarts the sidelink release timer.

Step 3: when the UE1 does not send or receive a sidelink data packet within a period of time, the sidelink release timer continuously runs, and after the sidelink release timer expires, the UE1 automatically initiates a process of releasing a sidelink unicast link.

Step 4: the UE1 sends a unicast connection release message to the peer UE2, where the unicast connection release message includes at least one of the following configuration information:
UE identifier information, including IDs of UE at two ends in a unicast connection, for example, an ID of the UE1 and an ID of the UE2; or
a cause value, used to indicate a cause why the UE sends the unicast connection release message.

The cause of the unicast connection release message includes at least one of the following:
a sidelink connection fails; or
the sidelink release timer expires.

Step 5: after receiving the unicast connection release message of the UE1, the UE2 releases the unicast connection, where a specific behavior of releasing the unicast connection may include at least one of the following:
resetting MAC;
stopping all running timers except a second timer, where the second timer is one or more timers configured by the first terminal or configured by the second terminal or configured by a base station or specified in a protocol; or stopping a timer configured by the first terminal or configured by the second terminal or configured by a base station or specified in a protocol;
releasing a radio bearer and a corresponding protocol layer entity; or
notifying a release and/or a corresponding release cause (cause value) of a sidelink unicast connection to a higher layer of the UE2.

Step 6: after receiving the unicast connection release message of the UE1, the UE2 may send feedback information to the UE1 before releasing the unicast connection or after releasing the unicast connection. In this case, if one or more of the following conditions are met, the UE1 determines that the unicast connection to the UE2 is successfully released.

The UE1 receives a connection release response message fed back by a physical layer of the UE2;
the UE1 receives a connection release response message fed back by an RLC layer of the UE2; and
the UE1 receives a new message from the UE2, where the new message is used to respond to a unicast connection setup release message.

Step 7: after the UE1 determines that the unicast connection to the UE2 is successfully released, the UE1 releases a sidelink connection to the UE2, where a specific behavior of releasing the unicast connection may include at least one of the following:

resetting MAC;
stopping all running timers except a first timer, where the first timer is one or more timers configured by the first terminal or configured by the second terminal or configured by a base station or specified in a protocol; or stopping a timer configured by the first terminal or configured by the second terminal or configured by a base station or specified in a protocol, where the first timer may be the same as the second timer or different from the second timer;
releasing a radio bearer and a corresponding protocol layer entity; or
notifying a release and/or a corresponding release cause (cause value) of a sidelink unicast connection to a higher layer of the UE1.

Step 6 and step 7 are optional steps.

In this embodiment, the network side device configures or preconfigures the sidelink release timer for the first terminal. After the sidelink release timer expires, the first terminal releases the sidelink connection to the second terminal. According to the technical solutions of the present disclosure, the terminal can release an established sidelink unicast connection on a sidelink.

Embodiment 2

In this embodiment, a base station configures a sidelink release timer for UE1, and a sidelink multicast link is established between the UE1 and UE2. The UE1 may be a transmit end in sidelink transmission, the UE2 is a receive end in sidelink transmission, or the UE2 may be a transmit end in sidelink transmission, and the UE1 is a receive end in sidelink transmission. The UE1 performs transmission on a sidelink, for example, sends or receives a protocol data unit (PDU) and/or a service data unit (SDU) at a MAC layer or another layer, and starts or restarts the sidelink release timer. After the sidelink release timer expires, the UE1 automatically releases a sidelink multicast link.

The sidelink release method in this embodiment includes the following steps.

Step 1: the base station configures the sidelink release timer for the UE1 by using dedicated signaling or a system message, so that when the UE1 performs sidelink transmission, a link is automatically released based on the sidelink release timer. The sidelink release timer may act on a sidelink MAC layer of the UE1, or may act on another protocol layer.

Duration of the sidelink release timer may be specified in a protocol, or may be dynamically configured by the base station. The base station may dynamically configure the duration of the sidelink release timer based on a sidelink service type of the UE1.

Step 2: when performing sidelink multicast link transmission, the UE1 sends or receives a data packet, such as a MAC SDU, and starts or restarts the sidelink release timer.

Step 3: when the UE1 does not send or receive a sidelink data packet within a period of time, the sidelink release timer continuously runs, and after the sidelink release timer expires, the UE1 automatically initiates a process of releasing a sidelink multicast link.

Step 4: the UE1 sends a multicast connection release message to the peer UE2, where the multicast connection release message includes at least one of the following configuration information:
UE identifier information, including IDs of UE at two ends in a multicast connection, for example, an ID of the UE1 and an ID of the UE2; ord
a cause value, used to indicate a cause why the UE sends the multicast connection release message.

The cause of the multicast connection release message includes at least one of the following:
a sidelink connection fails; or
the sidelink release timer expires.

Step 5: after receiving the multicast connection release message of the UE1, the UE2 releases the multicast connection, where a specific behavior of releasing the multicast connection may include at least one of the following:
resetting MAC;
stopping all running timers except a second timer, where the second timer is one or more timers configured by the first terminal or configured by the second terminal or configured by a base station or specified in a protocol; or stopping a timer configured by the first terminal or configured by the second terminal or configured by a base station or specified in a protocol;
releasing a radio bearer and a corresponding protocol layer entity; or
notifying a release and/or a corresponding release cause (cause value) of a sidelink multicast connection to a higher layer of the UE2.

Step 6: after receiving the multicast connection release message of the UE1, the UE2 may send feedback information to the UE1 before releasing the multicast connection or after releasing the multicast connection. In this case, if one or more of the following conditions are met, the UE1 determines that the multicast connection to the UE2 is successfully released.

The UE1 receives a connection release response message fed back by a physical layer of the UE2;
the UE1 receives a connection release response message fed back by an RLC layer of the UE2; and
the UE1 receives a new message from the UE2, where the new message is used to respond to a multicast connection setup release message.

Step 7: after the UE1 determines that the multicast connection to the UE2 is successfully released, the UE1 releases a sidelink connection to the UE2, where a specific behavior of releasing the multicast connection may include at least one of the following:
resetting MAC;
stopping all running timers except a first timer, where the first timer is one or more timers configured by the first terminal or configured by the second terminal or configured by a base station or specified in a protocol; or stopping a timer configured by the first terminal or configured by the second terminal or configured by a base station or specified in a protocol, where the first timer may be the same as the second timer or different from the second timer;
releasing a radio bearer and a corresponding protocol layer entity; or
notifying a release and/or a corresponding release cause (cause value) of a sidelink multicast connection to a higher layer of the UE1.

Step 6 and step 7 are optional steps.

In this embodiment, the network side device configures or preconfigures the sidelink release timer for the first terminal. After the sidelink release timer expires, the first terminal releases the sidelink connection to the second terminal. According to the technical solution of the present disclosure, the terminal can release an established sidelink multicast connection on a sidelink.

Embodiment 3

In this embodiment, a base station configures a sidelink release timer and a data inactivity timer for UE1, and a sidelink link is established between the UE1 and UE2. The UE1 may be a transmit end in sidelink transmission, the UE2 is a receive end in sidelink transmission, or the UE2 may be a transmit end in sidelink transmission, and the UE1 is a receive end in sidelink transmission. Data receiving and sending on a sidelink and a Uu interface of the UE1 may affect starting and restarting of the two timers: the sidelink release timer and the data inactivity timer.

The sidelink release method in this embodiment includes the following steps.

Step 1: the base station configures two timers: a data inactivity timer and a sidelink release timer on a Uu interface for the UE1 by using dedicated signaling or a system message. The two timers can be configured in a same message or in two messages. When the two timers are configured in two messages, a sequence of the two messages is not limited. The data inactivity timer on the Uu interface indicates that if the UE does not receive or send data on the Uu interface within a period of time (that is, receive data from the base station or send data to the base station), the UE leaves an RRC connected state.

Step 2: for starting and restarting of the two timers, there may be at least one of the following cases:
 if the UE1 receives or sends data on the sidelink, the two timers are started or restarted;
  if the UE1 receives or sends data on the sidelink, only the sidelink release timer is restarted, and the data inactivity timer is not restarted;
  if the UE1 receives or sends data on the Uu interface, the two timers are started or restarted; or
  if the UE1 receives or sends data on the Uu interface, only the data inactivity timer is restarted, and the sidelink release timer is not restarted.

Step 3: after the sidelink release timer expires, the UE1 releases a sidelink connection to the UE2, where a specific behavior of releasing the sidelink connection may include at least one of the following:
 resetting MAC;
 stopping all running timers except a third timer, where the third timer is one or more timers configured by the first terminal or configured by the second terminal or configured by a base station or specified in a protocol; or stopping a timer configured by the first terminal or configured by the second terminal or configured by a base station or specified in a protocol;
 releasing a radio bearer and a corresponding protocol layer entity;
 notifying a release and/or a corresponding release cause (cause value) of a sidelink connection to a higher layer of the UE1; or
 entering an RRC idle (IDLE) state or an RRC inactive (INACTIVE) state.

The sidelink connection is a sidelink multicast connection or a sidelink unicast connection.

In this embodiment, the network side device configures or preconfigures the sidelink release timer and the data inactivity timer for the first terminal. After the sidelink release timer expires, the first terminal releases the sidelink connection to the second terminal. After the data inactivity timer expires, the first terminal releases an RRC connection to the network side device. According to the technical solution of the present disclosure, the terminal can release an established sidelink connection on a sidelink and release an RRC connection to the network side device.

Figure 4:
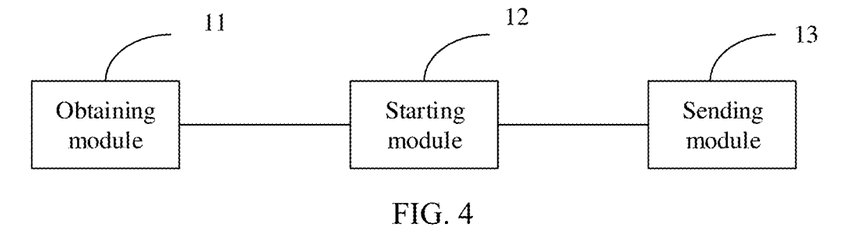
FIG. 4 is a schematic structural diagram of a first terminal according to an embodiment of the present disclosure.

As shown in FIG. 4, an embodiment of the present disclosure further provides a first terminal, including:

an obtaining module 11, configured to obtain a sidelink release timer, where the sidelink release timer is configured or preconfigured by a network side device, or the sidelink release timer is configured by a second terminal or obtained by a second terminal from a network side configuration;

a starting module 12, configured to start or restart the sidelink release timer after data is received from the second terminal or sent to the second terminal on a sidelink connection; and a sending module 13, configured to send a sidelink connection release message to the second terminal or notify a higher layer of the first terminal after the sidelink release timer expires.

In this embodiment, the network side device configures or preconfigures the sidelink release timer for the first terminal, or the second terminal configures the sidelink release timer or obtains the sidelink release timer from the network side configuration. After the sidelink release timer expires, the first terminal releases the sidelink connection to the second terminal. According to the technical solution of the present disclosure, the terminal can release an established connection on a sidelink.

Optionally, the notifying a higher layer of the first terminal includes at least one of the following:
 notifying a release of the sidelink connection to the higher layer of the first terminal;
 notifying a release cause of the sidelink connection to the higher layer of the first terminal;
 notifying the higher layer of the first terminal that the sidelink release timer expires;
 notifying the higher layer of the first terminal that the sidelink connection fails; or
 notifying the higher layer of the first terminal that a radio link failure occurs in the first terminal.

Optionally, the obtaining module is configured to obtain the sidelink release timer configured by the network side device by using dedicated signaling or a system message.

Optionally, the sidelink release timer is configured by the second terminal or obtained by the second terminal from the network side configuration, and the obtaining module is configured to obtain a sidelink release timer configuration sent by the second terminal.

Optionally, duration of the sidelink release timer is determined in at least one of the following manners:
 a protocol stipulation; or
 a configuration or preconfiguration of the network side device.

The configuration of the network side device is no longer required in the protocol stipulation manner, so that signaling interaction between the network side device and a terminal can be avoided. The duration of the sidelink release timer can be flexibly adjusted through the configuration or the preconfiguration of the network side device.

Optionally, the sidelink connection release message includes at least one of the following information:
 an identifier of the first terminal;
 an identifier of the second terminal, where the identifier of the first terminal and the identifier of the second terminal can enable the second terminal to accurately learn the sidelink connection that needs to be released; or
 indication information of a sidelink connection release cause, where the indication information of the sidelink connection release cause can enable the second terminal to learn the reason for the sidelink connection release cause.

Optionally, the sidelink connection release cause includes at least one of the following:
the sidelink release timer expires; or
the sidelink connection fails.
Optionally, the first terminal further includes:
a receiving module, configured to receive a connection release response message fed back by the second terminal; and
a releasing module, configured to release the sidelink connection to the second terminal.

In this embodiment, the first terminal may release the sidelink connection after receiving the connection release response message fed back by the second terminal, or may release the sidelink connection when the connection release response message fed back by the second terminal is not received.

Optionally, the receiving module is configured to perform at least one of the following:
receiving a connection release response message fed back by a physical layer of the second terminal;
receiving a connection release response message fed back by a radio link control RLC layer of the second terminal; or
receiving a connection release response message of the second terminal.

Optionally, the releasing module is configured to perform at least one of the following:
resetting a media access control MAC layer;
stopping all running timers except a first timer, where the first timer is one or more timers configured by the first terminal or configured by the second terminal or configured by a base station or specified in a protocol;
releasing a radio bearer and a corresponding protocol layer entity;
notifying a release of the sidelink connection to the higher layer of the first terminal; or
notifying a release cause of the sidelink connection to the higher layer of the first terminal.

Optionally, the obtaining module is further configured to obtain a data inactivity timer configured by the network side device; and
the first terminal further includes:
a releasing module, configured to release a radio resource control RRC connection to the network side after the data inactivity timer expires, so that the terminal can be disconnected from the RRC connection to the network side.

Optionally, the starting module is configured to start or restart the sidelink release timer and the data inactivity timer in at least one of the following manners:
starting or restarting the sidelink release timer and the data inactivity timer after data is received from the second terminal or sent to the second terminal on the sidelink connection;
starting or restarting the sidelink release timer and skipping starting or skipping restarting the data inactivity timer after data is received from the second terminal or sent to the second terminal on the sidelink connection;
starting or restarting the sidelink release timer and the data inactivity timer after data is received from the network side or sent to the network side; or
starting or restarting the data inactivity timer and skipping starting or skipping restarting the sidelink release timer after data is received from the network side or sent to the network side.

Optionally, the releasing module is configured to perform at least one of the following:
resetting the MAC layer;
stopping all running timers except a third timer, where the third timer is one or more timers configured by the first terminal or configured by the second terminal or configured by the base station or specified in the protocol;
releasing the radio bearer and the corresponding protocol layer entity;
notifying the release of the sidelink connection to the higher layer of the first terminal;
notifying the release cause of the sidelink connection to the higher layer of the first terminal; or
entering an RRC idle state or an RRC inactive state.

Optionally, the sidelink connection includes a sidelink unicast connection or a sidelink multicast connection. In the technical solution of the present disclosure, the terminal can release an established sidelink unicast connection or an established sidelink multicast connection.

Figure 5:
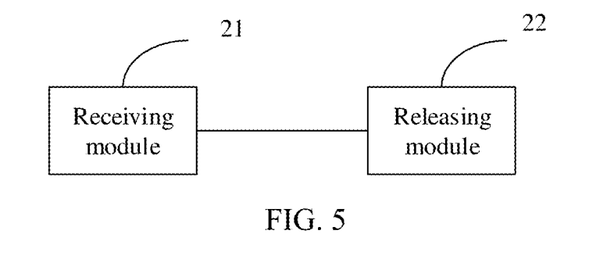
FIG. 5 is a schematic structural diagram of a second terminal according to an embodiment of the present disclosure.

As shown in FIG. 5, an embodiment of the present disclosure further provides a second terminal, including:
a receiving module 21, configured to receive a sidelink connection release message sent by a first terminal; and
a releasing module 22, configured to release a sidelink connection to the first terminal.

In this embodiment, after receiving the sidelink connection release message sent by the first terminal, the second terminal releases the sidelink connection to the first terminal. According to the technical solution of the present disclosure, the terminal can release an established connection on a sidelink.

Optionally, the sidelink connection release message includes at least one of the following information:
an identifier of the first terminal;
an identifier of the second terminal, where the identifier of the first terminal and the identifier of the second terminal can enable the second terminal to accurately learn the sidelink connection that needs to be released; or
indication information of a sidelink connection release cause, where the indication information of the sidelink connection release cause can enable the second terminal to learn the reason for the sidelink connection release cause.

Optionally, the sidelink connection release cause includes at least one of the following:
the sidelink release timer expires; or
the sidelink connection fails.

Optionally, the releasing module is configured to perform at least one of the following:
resetting a media access control MAC layer;
stopping all running timers except a second timer, where the second timer is one or more timers configured by the first terminal or configured by the second terminal or configured by a base station or specified in a protocol;
releasing a radio bearer and a corresponding protocol layer entity;
notifying a release of the sidelink connection to a higher layer of the second terminal; or
notifying a release cause of the sidelink connection to a higher layer of the second terminal.

Optionally, the second terminal further includes:
a second sending module, configured to send a sidelink release timer configuration to the first terminal, where the sidelink release timer is configured by the second terminal or obtained by the second terminal from a network side configuration.

Optionally, the second terminal further includes:
a feedback module, configured to feed back a connection release response message to the first terminal, so that the first terminal can release a sidelink connection to the second terminal after receiving the connection release response message.

Optionally, the feedback module is configured to perform at least one of the following:
feeding back, by using a physical layer of the second terminal, a connection release response message to the first terminal;
feeding back, by using a radio link control RLC layer of the second terminal, a connection release response message to the first terminal; or
feeding back a connection release response message to the first terminal.

Optionally, the sidelink connection includes a sidelink unicast connection or a sidelink multicast connection. In the technical solution of the present disclosure, the terminal can release an established sidelink unicast connection or an established sidelink multicast connection.

Figure 6:
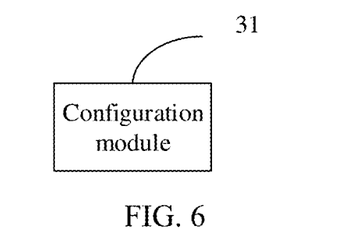
FIG. 6 is a schematic structural diagram of a network side device according to an embodiment of the present disclosure.

As shown in FIG. 6, an embodiment of the present disclosure further provides a network side device, including:
a configuring module 31, configured to configure a sidelink release timer for a first terminal, so that the first terminal releases a sidelink connection after the sidelink release timer expires.

In this embodiment, the network side device configures or preconfigures the sidelink release timer for the first terminal. After the sidelink release timer expires, the first terminal releases the sidelink connection to the second terminal. According to the technical solutions of the present disclosure, the terminal can release an established connection on a sidelink.

Optionally, the configuring module is configured to configure the sidelink release timer for the first terminal by using dedicated signaling or a system message.

Optionally, the configuring module is further configured to configure a data inactivity timer for the first terminal, so that the first terminal releases a radio resource control RRC connection to a network side after the data inactivity timer expires.

An embodiment of the present disclosure further provides a communications device, including a memory, a processor, and a computer program that is stored in a memory and that can run on the processor. When the computer program is executed by the processor, steps in the foregoing sidelink release method are implemented.

The communications device may be a network side device or a terminal.

Figure 7:
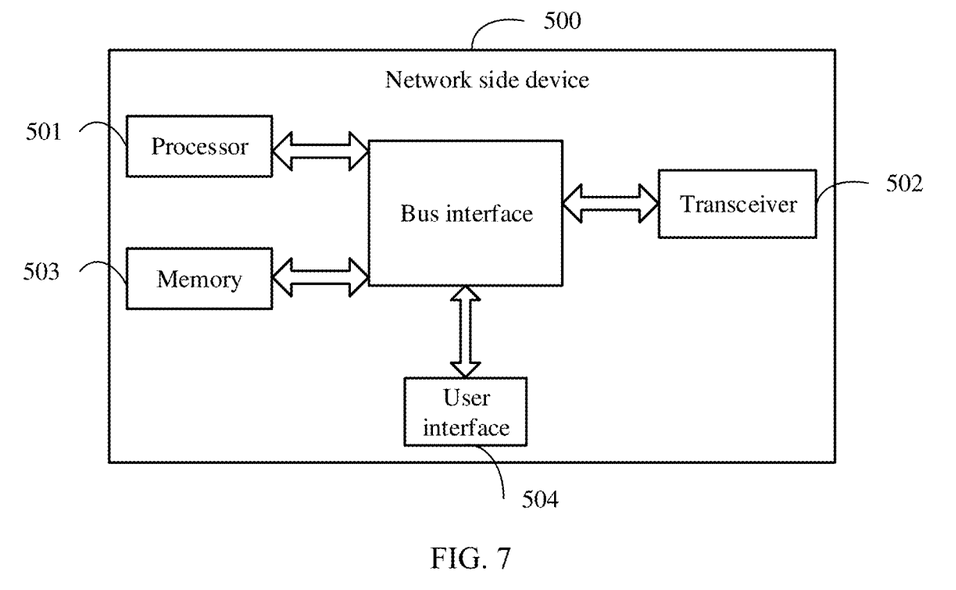
FIG. 7 is a schematic composition diagram of a terminal according to an embodiment of the present disclosure.

When the communications device is a network side device, as shown in FIG. 7, a network side device 500 includes a processor 501, a transceiver 502, a memory 503, a user interface 504, and a bus interface.

In this embodiment of the present disclosure, the network side device 500 further includes a computer program that is stored in the memory 503 and that can run on the processor 501. When the computer program is executed by the processor 501, the following step is implemented: configuring a sidelink release timer for a first terminal.

In FIG. 7, a bus architecture may include any quantity of interconnected buses and bridges. Various circuits of one or more processors represented by the processor 501 and a memory represented by the memory 503 are interconnected. The bus architecture may further link various other circuits such as a peripheral device, a voltage regulator, and a power management circuit. These are well known in the art, and therefore are not further described in this specification. The bus interface provides an interface. The transceiver 502 may be a plurality of components. To be specific, the transceiver 502 includes a transmitter and a receiver, and provides a unit configured to communicate with various other apparatuses on a transmission medium. For different user equipment, the user interface 504 may alternatively be an interface for externally and internally connecting required equipment. The connected equipment includes but is not limited to a keypad, a display, a speaker, a microphone, a joystick, and the like.

The processor 501 is responsible for bus architecture management and general processing. The memory 503 may store data used by the processor 501 when the processor 501 performs an operation.

Optionally, the configuring a sidelink release timer for a first terminal includes:
configuring the sidelink release timer for the first terminal by using dedicated signaling or a system message.

Optionally, when the computer program is executed by the processor 501, the following step is further implemented:
configuring a data inactivity timer for the first terminal.

Figure 8:
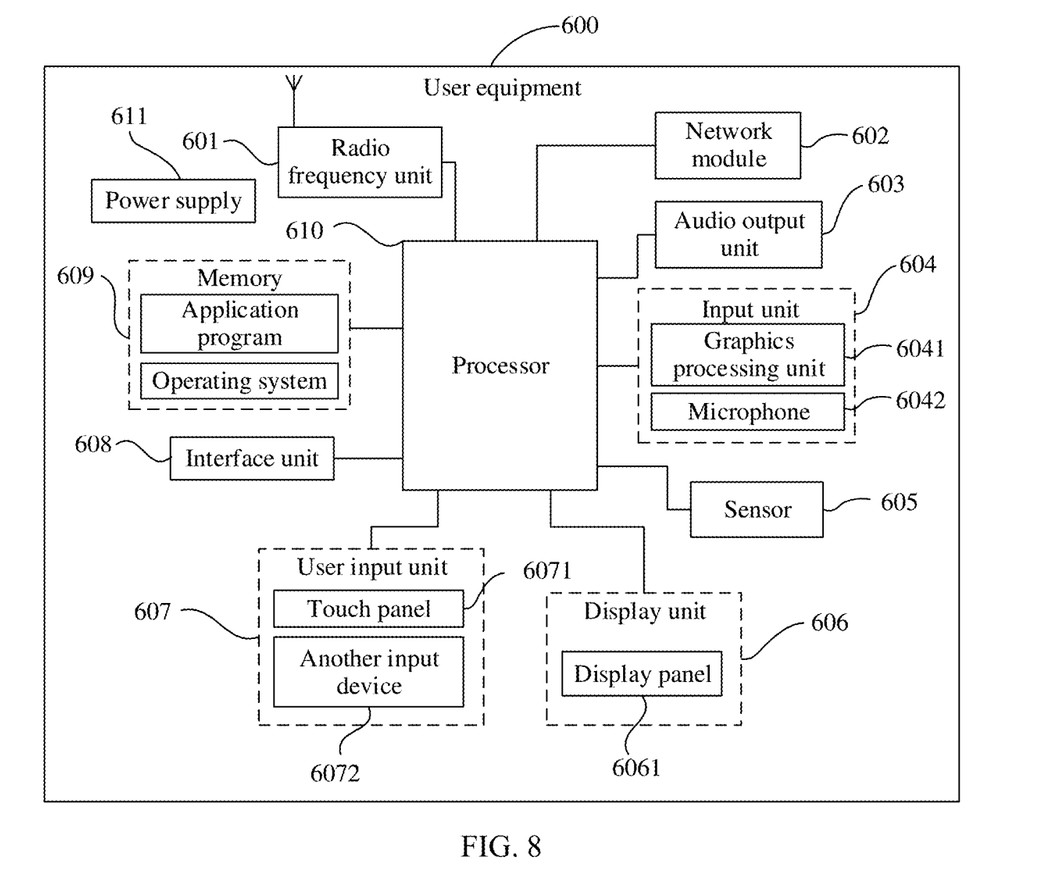
FIG. 8 is a schematic composition diagram of a network side device according to an embodiment of the present disclosure.

When the communications device is a terminal, as shown in FIG. 8, a terminal 600 includes but is not limited to components such as a radio frequency unit 601, a network module 602, an audio output unit 603, an input unit 604, a sensor 605, a display unit 606, a user input unit 607, an interface unit 608, a memory 609, a processor 610, and a power supply 611. It may be understood by persons skilled in the art that, the terminal structure shown in FIG. 8 does not constitute any limitation on the terminal, and the terminal may include more or fewer components than those shown in the figure, or combine some components, or have different component arrangements. In the embodiments of the present disclosure, the terminal includes, but is not limited to, a mobile phone, a tablet computer, a notebook computer, a palmtop computer, a vehicle-mounted terminal, a wearable device, a pedometer, or the like.

When the terminal is a first terminal of a sidelink connection, the processor 610 is configured to: obtain a sidelink release timer, where the sidelink release timer is configured or preconfigured by a network side device, or the sidelink release timer is configured by a second terminal or obtained by a second terminal from a network side configuration; start or restart the sidelink release timer after data is received from the second terminal or sent to the second terminal on a sidelink connection; and send a sidelink connection release message to the second terminal or notify a higher layer of the first terminal after the sidelink release timer expires.

Optionally, the notifying a higher layer of the first terminal includes at least one of the following:
notifying a release of the sidelink connection to the higher layer of the first terminal;
notifying a release cause of the sidelink connection to the higher layer of the first terminal;
notifying the higher layer of the first terminal that the sidelink release timer expires;
notifying the higher layer of the first terminal that the sidelink connection fails; or
notifying the higher layer of the first terminal that a radio link failure occurs in the first terminal.

Optionally, the obtaining the sidelink release timer configured by the network side device includes:
obtaining the sidelink release timer configured by the network side device by using dedicated signaling or a system message.

Optionally, the sidelink release timer is configured by the second terminal or obtained by the second terminal from the network side configuration, and the obtaining a sidelink release timer includes:

obtaining a sidelink release timer configuration sent by the second terminal.

Optionally, duration of the sidelink release timer is determined in at least one of the following manners:

a protocol stipulation; or a configuration or preconfiguration of the network side device.

Optionally, the sidelink connection release message includes at least one of the following information:

an identifier of the first terminal;

an identifier of the second terminal; or indication information of a sidelink connection release cause.

Optionally, the sidelink connection release cause includes at least one of the following:

the sidelink release timer expires; or the sidelink connection fails.

Optionally, when the computer program is executed by the processor 610, the following steps are further implemented:

receiving a connection release response message fed back by the second terminal; and releasing the sidelink connection to the second terminal.

Optionally, the receiving a connection release response message fed back by the second terminal includes at least one of the following:

receiving a connection release response message fed back by a physical layer of the second terminal;

receiving a connection release response message fed back by a radio link control RLC layer of the second terminal; or receiving a connection release response message of the second terminal.

Optionally, the releasing the sidelink connection to the second terminal includes:

resetting a media access control MAC layer;

stopping all running timers except a first timer, where the first timer is one or more timers configured by the first terminal or configured by the second terminal or configured by a base station or specified in a protocol;

releasing a radio bearer and a corresponding protocol layer entity;

notifying a release of the sidelink connection to the higher layer of the first terminal; and notifying a release cause of the sidelink connection to the higher layer of the first terminal.

Optionally, when the computer program is executed by the processor 610, the following steps are further implemented:

obtaining a data inactivity timer configured by the network side device; and releasing a radio resource control RRC connection to the network side after the data inactivity timer expires.

Optionally, the sidelink release timer and the data inactivity timer are started or restarted in at least one of the following manners:

starting or restarting the sidelink release timer and the data inactivity timer after data is received from the second terminal or sent to the second terminal on the sidelink connection;

starting or restarting the sidelink release timer and skipping starting or skipping restarting the data inactivity timer after data is received from the second terminal or sent to the second terminal on the sidelink connection;

starting or restarting the sidelink release timer and the data inactivity timer after data is received from the network side or sent to the network side; or starting or restarting the data inactivity timer and skipping starting or skipping restarting the sidelink release timer after data is received from the network side or sent to the network side.

Optionally, the releasing an RRC connection includes:

resetting the MAC layer;

stopping all running timers except a third timer, where the third timer is one or more timers configured by the first terminal or configured by the second terminal or configured by the base station or specified in the protocol;

releasing the radio bearer and the corresponding protocol layer entity;

notifying the release of the sidelink connection to the higher layer of the first terminal;

notifying the release cause of the sidelink connection to the higher layer of the first terminal; and entering an RRC idle state or an RRC inactive state.

Optionally, the sidelink connection includes a sidelink unicast connection or a sidelink multi cast connection.

When the terminal is a second terminal of a sidelink connection, the processor 610 is configured to: receive a sidelink connection release message sent by a first terminal; and release a sidelink connection to the first terminal.

Optionally, the sidelink connection release message includes at least one of the following information:

an identifier of the first terminal;

an identifier of the second terminal; or indication information of a sidelink connection release cause.

Optionally, the sidelink connection release cause includes at least one of the following:

the sidelink release timer expires; or the sidelink connection fails.

Optionally, the releasing the sidelink connection to the first terminal includes at least one of the following:

resetting a media access control MAC layer;

stopping all running timers except a second timer, where the second timer is one or more timers configured by the first terminal or configured by the second terminal or configured by a base station or specified in a protocol;

releasing a radio bearer and a corresponding protocol layer entity;

notifying a release of the sidelink connection to a higher layer of the second terminal; or notifying a release cause of the sidelink connection to a higher layer of the second terminal.

Optionally, when the computer program is executed by the processor 610, the following steps is further performed:

sending a sidelink release timer configuration to the first terminal, where the sidelink release timer is configured by the second terminal or obtained by the second terminal from a network side configuration.

Optionally, when the computer program is executed by the processor 610, the following step is further implemented:

feeding back a connection release response message to the first terminal.

Optionally, the feeding back a connection release response message to the first terminal includes at least one of the following:

feeding back, by a physical layer of the second terminal, a connection release response message to the first terminal;

feeding back, by a radio link control RLC layer of the second terminal, a connection release response message to the first terminal; or feeding back, by the second terminal, a connection release response message to the first terminal.

Optionally, the sidelink connection includes a sidelink unicast connection or a sidelink multi cast connection.

It should be understood that, in this embodiment of the present disclosure, the radio frequency unit 601 may be configured to receive and send information or a signal in a call process. After receiving downlink data from a base station, the radio frequency unit 601 sends the downlink data to the processor 610 for processing. In addition, the radio frequency unit 601 sends uplink data to the base station. Usually, the radio frequency unit 601 includes but is not limited to an antenna, at least one amplifier, a transceiver, a coupler, a low noise amplifier, a duplexer, and the like In addition, the radio frequency unit 601 may communicate with a network and another device through a wireless communication system.

The terminal provides wireless broadband Internet access for the user by using the network module 602, for example, helping the user to send and receive an e-mail, brows a web page, and access streaming media.

The audio output unit 603 can convert audio data received by the radio frequency unit 601 or the network module 602 or stored in the memory 609 into an audio signal, and output the audio signal into sound. Moreover, the audio output unit 603 may further provide audio output (for example, call signal receiving sound and message receiving sound) related to a specific function performed by the terminal 600. The audio output unit 603 includes a loudspeaker, a buzzer, a receiver, and the like.

The input unit 604 is configured to receive audio or radio frequency signals. The input unit 604 may include a graphics processing unit (Graphics Processing Unit, GPU) 6041 and a microphone 6042. The graphics processing unit 6041 processes image data of a static image or video obtained by an image capture apparatus (such as, a camera) in a video capture mode or an image capture mode. A processed image frame can be displayed on the display unit 606. The image frame processed by the graphics processing unit 6041 may be stored in the memory 609 (or another storage medium) or sent by using the radio frequency unit 601 or the network module 602. The microphone 6042 may receive a sound and can process such sound into audio data. The processed audio data can be converted into a format that can be sent to a mobile communications base station through the radio frequency unit 601 in a telephone call mode, for outputting.

The terminal 600 further includes at least one sensor 605, such as a light sensor, a motion sensor, and other sensors. The light sensor includes an ambient light sensor and a proximity sensor. The ambient light sensor may adjust luminance of the display panel 6061 based on brightness of ambient light. The proximity sensor may turn off the display panel 6061 and/or backlight when the terminal 600 moves to an ear. As a type of the motion sensor, an accelerometer sensor may detect an acceleration value in each direction (generally, three axes), and detect a value and a direction of gravity when the accelerometer sensor is static, and may be used in an application for recognizing a mobile terminal posture (such as screen switching between landscape and portrait modes, a related game, or magnetometer posture calibration), a function related to vibration recognition (such as a pedometer or a knock), and the like. The sensor 605 may further include a fingerprint sensor, a pressure sensor, an iris sensor, a molecular sensor, a gyroscope, a barometer, a hygrometer, a thermometer, an infrared sensor, and the like. Details are not described herein.

The display unit 606 is configured to display information entered by a user or information provided for the user. The display unit 606 may include a display panel 6061. The display panel 6061 may be configured in a form of a liquid crystal display (Liquid Crystal Display, LCD), an organic light-emitting diode (Organic Light-Emitting Diode, OLED), or the like.

The user input unit 607 can be configured to receive input numeric or character information, and generate key signal inputs related to user settings and function control of the terminal. The user input unit 607 includes a touch panel 6071 and another input device 6072. The touch panel 6071 is also referred to as a touchscreen, and may collect a touch operation performed by a user on or near the touch panel 6071 (such as an operation performed by a user on the touch panel 6071 or near the touch panel 6071 by using any proper object or accessory, such as a finger or a stylus). The touch panel 6071 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, sends the touch point coordinates to the processor 610, and receives and executes a command sent by the processor 610. In addition, the touch panel 6071 can be implemented in various types such as resistive, capacitive, infrared, and surface acoustic wave. The user input unit 607 may include another input device 6072 in addition to the touch panel 6071. The another input device 6072 may include but is not limited to a physical keyboard, function keys (such as a volume control key and a switch key), a trackball, a mouse, and a joystick. Details are not described herein.

Further, the touch panel 6071 may cover the display panel 6061. When detecting the touch operation on or near the touch panel 6071, the touch panel 6071 transmits the touch operation to the processor 610 to determine a type of a touch event, and then the processor 610 provides corresponding visual output on the display panel 6061 based on the type of the touch event. Although in FIG. 8, the touch panel 6071 and the display panel 6061 implement input and output functions of the terminal as two independent components, in some embodiments, the touch panel 6071 and the display panel 6061 may be integrated to implement the input and output functions of the terminal. This is not specifically limited herein.

The interface unit 608 is an interface connecting an external apparatus to the terminal 600. For example, the external apparatus may include a wired or wireless headset port, an external power supply (or a battery charger) port, a wired or wireless data port, a memory card port, a port for connecting an apparatus having an identification module, an audio input/output (I/O) port, a video I/O port, a headset port, and the like. The interface unit 608 may be configured to receive an input (for example, data information and power) from an external apparatus and transmit the received input to one or more elements within the terminal 600, or may be configured to transmit data between the terminal 600 and the external apparatus.

The memory 609 may be configured to store software programs and various data. The memory 609 may mainly include a program storage area and a data storage area. The program storage area may store an operating system, an application program required by at least one function (such as a sound play function or an image play function), and the like. The data storage area may store data (such as audio data or an address book) created based on use of the mobile phone, and the like. In addition, the memory 609 may include a high-speed random access memory, and may further include a nonvolatile memory, for example, at least one magnetic disk storage device, a flash storage device, or another volatile solid-state storage device.

The processor 610 is a control center of the terminal, connects various parts of the entire terminal by using various interfaces and circuits, and performs various functions of the terminal and processes data by running or executing software programs and/or modules stored in the memory 609 and invoking data stored in the memory 609, so as to monitor the terminal as a whole. The processor 610 may include one or more processing units. Optionally, the processor 610 may integrate an application processor and a modem processor. The application processor mainly deals with an operating system, a user interface, an application program, and the like. The modem processor mainly deals with wireless communication. It may be understood that, alternatively, the modem processor may not be integrated into the processor 610.

The terminal 600 may further include a power supply 611 (for example, a battery) that supplies power to various components. Optionally, the power supply 611 may be logically connected to the processor 610 through a power supply management system, to perform functions of managing charging, discharging, and power consumption through the power supply management system.

In addition, the terminal 600 includes some function modules not shown, and details are not described herein.

An embodiment of the present disclosure further provides a non-transitory computer-readable storage medium. The non-transitory computer-readable storage medium stores a computer program, and when the computer program is executed by a processor, steps of the foregoing sidelink release method are implemented.

It may be understood that the embodiments described in this specification may be implemented by hardware, software, firmware, middleware, a microcode, or a combination thereof. For hardware implementation, a processing unit may be implemented in one or more Application Specific Integrated Circuits (Application Specific Integrated Circuits, ASIC), digital signal processors (Digital Signal Processing, DSP), digital signal processing devices (DSP Device, DSPD), programmable logic devices (Programmable Logic Device, PLD), field-programmable gate arrays (Field-Programmable Gate Array, FPGA), general purpose processors, controllers, microcontrollers, microprocessors, or other electronic units or a combination thereof used to perform the functions in the present disclosure.

For software implementation, the technology in this specification may be implemented through modules (for example, procedures or functions) that perform the functions in this specification. Software codes can be stored in the memory and executed by the processor. The memory can be implemented inside or outside the processor.

The embodiments in this specification are described in a progressive manner. Each embodiment focuses on a difference from another embodiment. For a same or similar part of the embodiments, refer to each other.

A person skilled in the art should understand that the embodiments of the present disclosure may be provided as a method, an apparatus, or a computer program product. Therefore, the embodiments of the present disclosure may be complete hardware embodiments, complete software embodiments, or software-hardware combined embodiments. Moreover, the embodiments of the present disclosure may use a form of a computer program product that is implemented on one or more computer-usable storage media (including but not limited to a magnetic disk memory, a CD-ROM, an optical memory, and the like) that include computer-usable program code.

The embodiments of the present disclosure are described with reference to the flowcharts and/or block diagrams of the methods, user equipment (system), and computer program products thereof. It should be understood that computer program commands can be used to implement each of the procedures and/or blocks in the flowcharts and/or block diagrams, and combinations of procedures and/or blocks in the flowcharts and/or block diagrams. These computer program instructions may be provided for a general-purpose computer, a dedicated computer, an embedded processor, or a processor of any other programmable data processing user equipment to generate a machine, so that the instructions executed by a computer or a processor of any other programmable data processing user equipment generate an apparatus for implementing a specific function in one or more processes in the flowcharts and/or in one or more blocks in the block diagrams.

Those computer program commands can further be stored a computer readable memory, which can guide the computer or another processor that can program data processing user equipment, to work in a specific away, so that the commands stored in the computer readable memory generate a manufactured product including a command device. The command device implements one or more procedures in the flowchart and/or one or more blocks in the block diagram.

Those computer program commands can further be loaded in a computer or another programmable user equipment, so that a series of steps are executed in the computer or the programmable user equipment to generate processing for computer implementation. Thus, commands executed in the computer or another programmable user equipment provide steps for implementing one or more procedures of the flowchart and/or steps for conducting functions specified in one or more blocks of the block diagram.

Although some optional embodiments in the embodiments of this disclosure have been described, persons skilled in the art can make changes and modifications to these embodiments once they learn the basic inventive concept. Therefore, the following claims are intended to be construed as to cover optional embodiments and all changes and modifications falling within the scope of the embodiments of this disclosure.

It should further be noted that in this specification, relational terms such as first and second are only used to distinguish one entity or operation from another, and do not necessarily require or imply that any actual relationship or sequence exists between these entities or operations. Moreover, terms "including", "comprising", or any other variants are used to cover non-exclusive inclusion, so that processes, methods, articles or user equipment, each of which includes a series of factors, include not only those factors but also other unlisted factors, or further include other inherent factors of such processes, methods, articles or user equipment. An element limited by "includes a . . . " does not, without more constraints, preclude the presence of additional identical elements in the process, method, article, or user equipment that includes the element.

The foregoing descriptions are merely optional implementations of the present disclosure. It should be noted that a person of ordinary skill in the art may make several improvements and polishing without departing from the principle of the present disclosure and the improvements and polishing shall fall within the protection scope of the present disclosure.

The invention claimed is:

1. A sidelink release method, applied to a first terminal and comprising:
   obtaining a sidelink release timer, wherein the sidelink release timer is configured or preconfigured by a network side device, or the sidelink release timer is configured by a second terminal or obtained by a second terminal from a network side configuration;
   starting or restarting the sidelink release timer after data is received from the second terminal or sent to the second terminal on a sidelink connection; and
   notifying a higher layer of the first terminal after the sidelink release timer expires.

2. The method according to claim 1, wherein the notifying a higher layer of the first terminal comprises at least one of:
   notifying a release of the sidelink connection to the higher layer of the first terminal;
   notifying a release cause of the sidelink connection to the higher layer of the first terminal;
   notifying the higher layer of the first terminal that the sidelink release timer expires;
   notifying the higher layer of the first terminal that the sidelink connection fails; or
   notifying the higher layer of the first terminal that a radio link failure occurs in the first terminal.

3. The sidelink release method according to claim 1, wherein the obtaining the sidelink release timer configured by the network side device comprises:
   obtaining the sidelink release timer configured by the network side device by using dedicated signaling or a system message.

4. The sidelink release method according to claim 1, wherein the sidelink release timer is configured by the second terminal or obtained by the second terminal from the network side configuration, and the obtaining a sidelink release timer comprises:
   obtaining a sidelink release timer configuration sent by the second terminal.

5. The sidelink release method according to claim 1, wherein duration of the sidelink release timer is determined in at least one of following manners:
   a specified configuration in a protocol; or
   a configuration or preconfiguration of the network side device.

6. The sidelink release method according to claim 1, further comprising:
   sending a sidelink connection release message to the second terminal after the sidelink release timer expires;
   wherein the sidelink connection release message comprises at least one of following information:
   an identifier of the first terminal;
   an identifier of the second terminal; or
   indication information of a sidelink connection release cause.

7. The sidelink release method according to claim 6, wherein the sidelink connection release cause comprises at least one of:
   the sidelink release timer expires; or
   the sidelink connection fails.

8. The sidelink release method according to claim 1, further comprising at least one of:
   receiving a connection release response message fed back by the second terminal, and releasing the sidelink connection to the second terminal; or
   releasing the sidelink connection to the second terminal.

9. The sidelink release method according to claim 8, wherein the receiving a connection release response message fed back by the second terminal comprises at least one of:
   receiving a connection release response message fed back by a physical layer of the second terminal;
   receiving a connection release response message fed back by a radio link control (RLC) layer of the second terminal; or
   receiving a connection release response message of the second terminal.

10. The sidelink release method according to claim 8, wherein the releasing the sidelink connection to the second terminal comprises at least one of:
    resetting a media access control (MAC) layer;
    stopping all running timers except a first timer, wherein the first timer includes one or more timers configured by the first terminal or configured by the second terminal or configured by a base station or specified in a protocol;
    releasing a radio bearer and a corresponding protocol layer entity;
    notifying a release of the sidelink connection to the higher layer of the first terminal; or
    notifying a release cause of the sidelink connection to the higher layer of the first terminal.

11. The sidelink release method according to claim 1, further comprising:
    obtaining a data inactivity timer configured by the network side device; and
    releasing a radio resource control (RRC) connection to the network side after the data inactivity timer expires.

12. The sidelink release method according to claim 11, wherein the sidelink release timer and the data inactivity timer are started or restarted in at least one of following manners:
    starting or restarting the sidelink release timer and the data inactivity timer after data is received from the second terminal or sent to the second terminal on the sidelink connection;
    starting or restarting the sidelink release timer and skipping starting or skipping restarting the data inactivity timer after data is received from the second terminal or sent to the second terminal on the sidelink connection;
    starting or restarting the sidelink release timer and the data inactivity timer after data is received from the network side or sent to the network side; or
    starting or restarting the data inactivity timer and skipping starting or skipping restarting the sidelink release timer after data is received from the network side or sent to the network side.

13. The sidelink release method according to claim 11, wherein the releasing an RRC connection comprises at least one of:
    resetting a media access control (MAC) layer;
    stopping all running timers except a third timer, wherein the third timer includes one or more timers configured by the first terminal or configured by the second terminal or configured by the base station or specified in the protocol;

releasing the radio bearer and the corresponding protocol layer entity;
notifying a release of the sidelink connection to the higher layer of the first terminal;
notifying a release cause of the sidelink connection to the higher layer of the first terminal; or
entering an RRC idle state or an RRC inactivity state.

14. The sidelink release method according to claim 1, wherein
the sidelink connection comprises a sidelink unicast connection or a sidelink multicast connection.

15. A terminal, comprising a memory, a processor, and a program that is stored in the memory and configured to run on the processor, wherein when the program is executed by the processor, the program causes the terminal to perform:
obtaining a sidelink release timer, wherein the sidelink release timer is configured or preconfigured by a network side device, or the sidelink release timer is configured by a second terminal or obtained by a second terminal from a network side configuration;
starting or restarting the sidelink release timer after data is received from the second terminal or sent to the second terminal on a sidelink connection; and
notifying a higher layer of the first terminal after the sidelink release timer expires.

16. The terminal according to claim 15, wherein when the program is executed by the processor, the program causes the terminal to perform at least one of:
notifying a release of the sidelink connection to the higher layer of the first terminal;
notifying a release cause of the sidelink connection to the higher layer of the first terminal;
notifying the higher layer of the first terminal that the sidelink release timer expires;
notifying the higher layer of the first terminal that the sidelink connection fails; or
notifying the higher layer of the first terminal that a radio link failure occurs in the first terminal.

17. The terminal according to claim 15, wherein when the program is executed by the processor, the program causes the terminal to further perform:
sending a sidelink connection release message to the second terminal after the sidelink release timer expires;
wherein the sidelink connection release message comprises at least one of following information:
an identifier of the first terminal;
an identifier of the second terminal; or
indication information of a sidelink connection release cause.

18. The terminal according to claim 15, wherein when the program is executed by the processor, the program causes the terminal further to perform:
obtaining a data inactivity timer configured by the network side device; and
releasing a radio resource control (RRC) connection to the network side after the data inactivity timer expires.

19. The terminal according to claim 18, wherein when the program is executed by the processor, the program causes the terminal to perform starting or restarting the sidelink release timer and the data inactivity timer in at least one of following manners:
starting or restarting the sidelink release timer and the data inactivity timer after data is received from the second terminal or sent to the second terminal on the sidelink connection;
starting or restarting the sidelink release timer and skipping starting or skipping restarting the data inactivity timer after data is received from the second terminal or sent to the second terminal on the sidelink connection;
starting or restarting the sidelink release timer and the data inactivity timer after data is received from the network side or sent to the network side; or
starting or restarting the data inactivity timer and skipping starting or skipping restarting the sidelink release timer after data is received from the network side or sent to the network side.

20. The terminal according to claim 19, wherein when the program is executed by the processor, the program causes the terminal to perform at least one of:
resetting a media access control (MAC) layer;
stopping all running timers except a third timer, wherein the third timer includes one or more timers configured by the first terminal or configured by the second terminal or configured by the base station or specified in the protocol;
releasing the radio bearer and the corresponding protocol layer entity;
notifying a release of the sidelink connection to the higher layer of the first terminal;
notifying a release cause of the sidelink connection to the higher layer of the first terminal; or
entering an RRC idle state or an RRC inactivity state.

* * * * *